United States Patent [19]

Shebanow et al.

[11] Patent Number: 5,443,415

[45] Date of Patent: Aug. 22, 1995

[54] BURNISHING APPARATUS FOR FLEXIBLE MAGNETIC DISKS AND METHOD THEREFOR

[75] Inventors: Michael S. Shebanow; Thomas R. Plourde; Bill M. Mullinax, all of Tucson, Ariz.

[73] Assignee: International Technology Partners, Inc., Tucson, Ariz.

[21] Appl. No.: 126,358

[22] Filed: Sep. 24, 1993

[51] Int. Cl.[6] .............................................. B24B 21/00
[52] U.S. Cl. .................................... 451/302; 451/303; 451/296
[58] Field of Search ............... 451/296, 302, 303, 311, 451/168, 63, 59

[56] References Cited

U.S. PATENT DOCUMENTS

| | | | |
|---|---|---|---|
| 3,943,666 | 3/1976 | Dion et al. | 51/106 |
| 4,179,852 | 12/1979 | Barnett | 51/132 |
| 4,330,910 | 5/1982 | Schachl et al. | 29/90 |
| 4,412,400 | 11/1983 | Hammond | 451/303 |
| 4,430,782 | 2/1984 | Bornhorst et al. | 29/90 |
| 4,671,018 | 6/1987 | Ekhoff | 451/302 |
| 4,676,029 | 6/1987 | Palmer | 451/302 |
| 4,930,259 | 6/1990 | Kobylenski et al. | 451/210 |
| 5,012,618 | 5/1991 | Price et al. | 451/302 |
| 5,018,311 | 5/1991 | Malagrimo, Jr. et al. | 451/302 |
| 5,065,547 | 11/1991 | Shimizu et al. | 451/296 |
| 5,065,548 | 11/1991 | Shimizu et al. | 451/296 |

OTHER PUBLICATIONS

Equipment Brochure: WESCORP Diskette Manufacturing Machinery, Niantic, CN.

Primary Examiner—Bruce M. Kisliuk
Assistant Examiner—Derris H. Banks
Attorney, Agent, or Firm—Antonio R. Durando; Harry M. Weiss

[57] ABSTRACT

A computer diskette burnishing machine that consists of two burnishing units adapted to operate on the magnetic medium of a conventional computer disk through the upper and lower read/write head access windows in the disk's protective shell. The assembled diskette is positioned on a lower burnishing unit that comprises a supporting plate having the same mechanical characteristics of a corresponding computer disk drive, including an electric motor equipped with a spindle/hub interface and shell registration pins. While the disk rotates, the burnishing units polish the disk's upper and lower surfaces by means of upper and lower abrasive tapes fed by a system of supply and take-up reels. The lower burnishing unit includes a resilient roller backing up the lower abrasive tape and disposed radially with respect to the plane of the disk. The upper burnishing unit consists of a spring-loaded resilient roller backing up the upper abrasive tape and disposed radially in parallel to the lower roller. The upper roller is supported by a spring-loaded mechanism that ensures a preset constant force against the disk when brought to press against it. Both upper and lower units are slidably mounted on a vertical slide and driven by a cam mechanism for cyclical vertical motion between burnishing steps. The cam mechanism is also used for moving disks sequentially into a working position, for opening the disk shutter prior to burnishing, and for removing polished disks.

30 Claims, 6 Drawing Sheets

BURNISHING APPARATUS FOR FLEXIBLE MAGNETIC DISKS AND METHOD THEREFOR

BACKGROUND OF THE INVENTION

1. Field of the Invention

This invention pertains to the general field of equipment for burnishing magnetic-disk media in the computer industry. In particular, it provides a new machine for burnishing the magnetic disks of conventional computer diskettes after assembly.

2. Description of the Prior Art

Most of the electronic information generated by personal computer users is recorded on flexible magnetic disks that provide compact and easy-to-use storage and portability. These disks are available commercially in two formats that have become standard within the industry: an older 5.25-inch flexible ("floppy") diskette, and a more recent 3.5-inch hard-shell disk. Although applicable to both formats, this invention is described particularly in terms of the 3.5-inch disks, which are rapidly becoming the prevalent format in the industry. In both formats, a flexible disk of magnetic medium is mounted in a protective cover within which the disk spins during use while maintaining contact with a magnetic read/write head through a window in the cover. The assembly includes a liner sandwiched between the cover and the disk for removing impurities that may become lodged therebetween as the disk rotates.

During the course of manufacture, each magnetic disk is produced by punching it from a polyester sheet substrate coated on both sides with magnetic particles suspended in a binder. The steps of manufacturing and coating the polyester substrate produce surface asperities that during use of the disk may cause a separation between the magnetic head and the disk, which in turn would results in loss of signal amplitude and possible read/write errors. Data errors consist of missing bits and extra bits. Missing bits are the most common and are usually caused by asperities on the surface of the coating or by airborne or process-related particles large enough to cause a separation between the head and the coating.

In order to correct this problem, it is necessary to polish the disks to produce as smooth a surface as possible, preferably to within a 0.1 $\mu$m tolerance. Therefore, the magnetic medium is burnished to remove surface asperities prior to assembly into the protective cover; this is typically done by rotating each disk while pressed against a very fine abrasive tape. After burnishing, the disks are then inserted into the protective cover which is sealed for final assembly.

The need for surface improvement of the magnetic medium by mechanical means was recognized early in the development of computer science when it was observed that raw disks showed a reduction of read/write errors after having been used for a period of time. Following a rapid initial improvement, the disk remained substantially unchanged until wearout. Accordingly, since that time numerous burnishing approaches have been taken to improve the surface quality of flexible magnetic disks to speed up the break-in period.

A variety of techniques is used by manufacturers to improve the surface quality of the disks produced commercially. These techniques are normally referred as burnishing, polishing or honing. Most modern burnishing operations employ abrasive tape to polish the disk surface. In all cases, the objective is to remove or reduce the height of surface imperfections. All of the burnishing equipment disclosed in the prior art consists of apparatus for polishing the magnetic medium prior to its assembly into the protective cover.

For example, U.S. Pat. No. 3,943,666 to Dion et al. (1976) describes a process that utilizes a rotating ceramic abrasive cylinder pressed against the magnetic medium of the flexible disk. The disk is mounted on a supporting resilient plate through its center hole and rotated in the direction opposite to the motion of the abrasive cylinder.

U.S. Pat. No. 4,179,852 to Barnett (1979) describes a method for polishing floppy disks with a uniform velocity across the radius of the disk. This is accomplished by overlapping the disk mounted on a rotating supporting plate with a polishing medium mounted on a plate rotating in the opposite direction. The patent shows apparatus for performing the procedure on the disk-shaped magnetic material prior to assembly into its protective shell.

In U.S. Pat. No. 4,330,910 (1982), Schachl et al. describe a device for burnishing the surfaces of magnetic disks consisting of a cylindrical body having a planar polishing surface with at least one groove positioned radially across the surface. The disk is polished by pressing the device against the magnetic material while the disk is rotated.

In U.S. Pat. No. 4,430,782 (1984), Bornhorst et al. disclose a burnishing tool having a plurality of holes in the planar surface that engages the flexible magnetic disk. The polishing action is accomplished through a blade positioned at a 45-degree angle with respect to the direction of motion. A vacuum system draws the disk against the burnishing surface and removes debris from the tool during use.

Other, more modern equipment incorporates the burnishing procedure in the manufacturing process as a step performed on each disk prior to enclosure in the protective shell. The burnishing of magnetic disks creates a very large number of small particles that are partly retained by the abrasive medium and partly deposited on the surface of the disk, requiring cleaning during assembly and during use to avoid errors caused by magnetic discontinuities. After burnishing, each disk is fitted with a hub and assembled into a protective plastic shell which is then normally welded around the disk by an ultrasonic weld operation. The welding process produces vibrations that cause the particles on the disk, which are unavoidably subject to some electrostatic or molecular forces, to aggregate and form sufficiently large asperities to affect the intimate contact between the disk and the magnetic head even after the disk has been polished by the burnishing procedure.

Therefore, manufacturers of burnishing machines have resorted to various operating techniques to minimize the problems associated with particle build-up. For example, Applied Data Communications, Inc., of Tustin, Calif., uses deionized air during the burnishing process to neutralize static charges. Wescorp of Niantic, Conn., produces a burnishing assembly machine that sequentially polishes the magnetic medium, applies a center hub to the burnished disk, and inserts it into a protective shell. By avoiding the stacking of polished disks between stages, the build-up of particles on the magnetic surface is minimized.

As the average unit price of flexible disks falls and the operating margins of manufacturers are squeezed, it becomes increasingly important to improve the assembly process and quality control to reduce manufacturing costs. Magnetic media and shell components are already available at very low cost. At the same time, the burnishing and certification steps have a significant effect on the yield and overall cost of manufacturing disks. All disks must be tested or certified to assure that each disk is error free. Depending on the defect, disks that are rejected during certification are either scrapped or sold for a lower price, which obviously affects significantly the overall cost of production. On the average, about 10-25 percent of all disks produced by the industry is rejected during the certification process.

Therefore, there still exists a need for burnishing equipment and techniques that improve quality control during the manufacturing process and reduce the rate of rejection caused by magnetic-medium surface imperfections. This invention is directed at solving these problems.

BRIEF SUMMARY OF THE INVENTION

The principal object of this invention is to provide a method and apparatus for burnishing flexible magnetic disks inside their shells or jackets after assembly, so as to add flexibility to the certification procedure by enabling a manufacturer to repeat the step when necessary.

Another goal of the invention is the accurate radial alignment of the abrasive medium with the effective center of the disk, such that each point of contact with the abrasive medium is concentric with respect to the magnetic tracks in contact with the read/write head during operation.

Another objective is a calibrated system for controlling the contact pressure between the abrasive medium and the magnetic tape in order to minimize surface aberrations caused by the initial impact between the two.

A further goal of the invention is a burnishing machine that may be easily incorporated in the production stream for automatic certification.

Finally, a further goal of the invention is the realization of the above mentioned goals in an economical and commercially viable manner, which is achieved by utilizing components that are either already commercially available or that can be produced at competitive prices.

To the accomplishment of these and other objectives, this invention consists of two burnishing units adapted to operate on the magnetic medium of a conventional computer disk through the upper and lower read/write head access windows in the disk's protective shell. The assembled disk is positioned on a lower burnishing unit that comprises a supporting plate having the same mechanical characteristics of a corresponding computer disk drive, including an electric motor equipped with a spindle/hub interface and shell registration pins. While the disk rotates, the burnishing units polish the disk's upper and lower surfaces by means of upper and lower abrasive tapes fed by a system of supply and take-up reels. The lower burnishing unit includes a resilient roller backing up the lower abrasive tape and disposed radially with respect to the plane of the disk. The upper burnishing unit consists of a spring-loaded resilient roller backing up the upper abrasive tape and disposed radially in parallel to the lower roller. The upper roller is supported by a spring-loaded mechanism that ensures a preset constant force against the disk when brought to press against it. Both upper and lower units are slidably mounted on a vertical slide and driven by a cam mechanism for cyclical vertical motion between burnishing steps. The cam mechanism is also used for moving disks sequentially into a working position, for opening the disk shutter prior to burnishing, and for removing polished disks.

Various other purposes and advantages of this invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only one of the various ways in which the invention may be practiced.

DETAILED DESCRIPTION OF THE INVENTION

The most important feature of this invention lies in the idea of burnishing conventional computer disks after enclosure in their protective jackets, rather than prior to assembly. As a result of this concept, disks that are found to be defective during certification can be burnished again to try and bring them within specification. With conventional burnishing equipment, the procedure could not be repeated without disassembly of the disk, which obviously renders it highly uneconomical and results in manufacturers routinely discarding large amounts of defective disks.

During the process of designing burnishing equipment capable of operating on an assembled disk, several other shortcomings of conventional burnishing technology have been addressed and corrected. Accordingly, this invention improves the concentric alignment of the abrasive surface with the recording tracks on the disk to ensure uniformity of abrasion. In addition, the pressure exercised by the polishing tape on the magnetic surface is carefully controlled, most importantly during the initial contact between the two, in order to avoid scuffing and other damaging effects upon impact.

Figure 1:
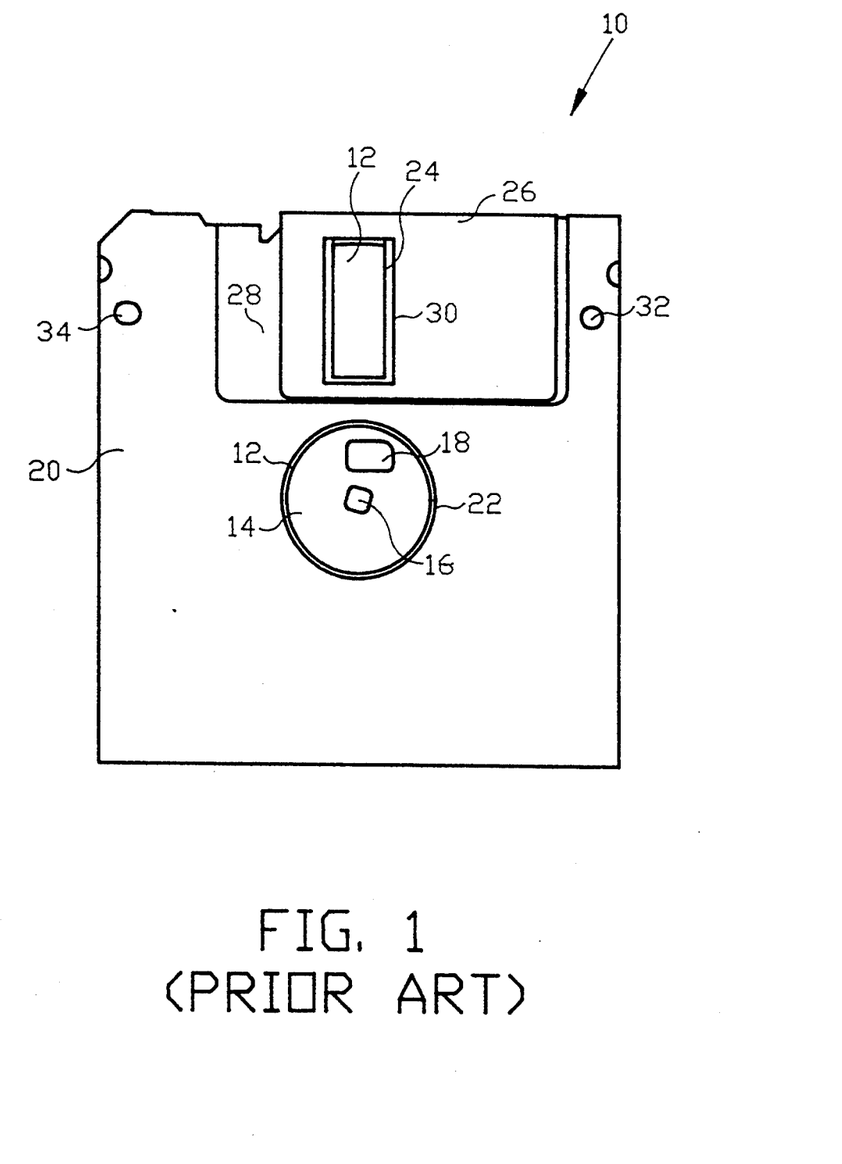
FIG. 1 is a bottom view of a standard 3.5-inch computer disk.

Referring to the drawings, wherein like parts are referred to throughout this specification by the same reference numerals and symbols, FIG. 1 shows the bottom side of a conventional 3.5-inch computer diskette 10. While this invention is described with reference to this disk format, those skilled in the art could obviously adapt it to operate on any size disks while retaining the functional features disclosed herein. The diskette 10 consists of an annular disk 12 coated on both sides with magnetic material and fitted with a metallic hub 14 for engagement with the rotating drive mechanism of a computer disk drive. A magnet in the drive holds the metal hub with a force of about 40 to 50 grams, sufficient to secure the hub to the motor even in a vertical position. The hub 14 contains two apertures 16 and 18 that are engaged by a spindle and a drive pin (not seen in the figures) in the motor assembly of the computer disk drive. The double engagement of the hub 14 by the spindle and drive pin ensures accurate chucking with a high degree of repeatability, a very important characteristic for precision tracking by the magnetic head. When the central aperture 16 is engaged by the motor spindle, the spring-loaded drive pin is pushed into the aperture 18 and produces a torque action that forces the spindle into an apposite corner of aperture 16, thus always aligning the disk to the same center point under torque.

The disk 12 is encased in a plastic shell 20 having a central opening 22 through which the hub 14 may be engaged and a radial window 24 for accessing the magnetic surface of the disk 12 for electronic read/write operations. The diskette 10 has a second equivalent window 24 on the other side of the disk 12 disposed exactly in overlapping position with respect to the first window 24. A normally-closed protective shutter 26 is slidably mounted in a recessed groove 28 in the shell 20 to cover the window 24 when the diskette 10 is free standing. When inserted into a computer disk drive, the shutter 26 is engaged by a mechanical arm and moved along the groove 28 to clear access to the window 24 through a conforming slot 30 in the shutter. The diskette has a similarly overlapping slot on the opposite side of the shutter 26 for accessing the second side of the disk through the corresponding window in the shell 20. Finally, the shell 20 of the diskette contains two alignment holes 32 and 34 that correspond to two alignment pins in the drive to provide the initial alignment of the diskette with the motor spindle when the diskette is pushed into the computer disk drive.

Figure 2:
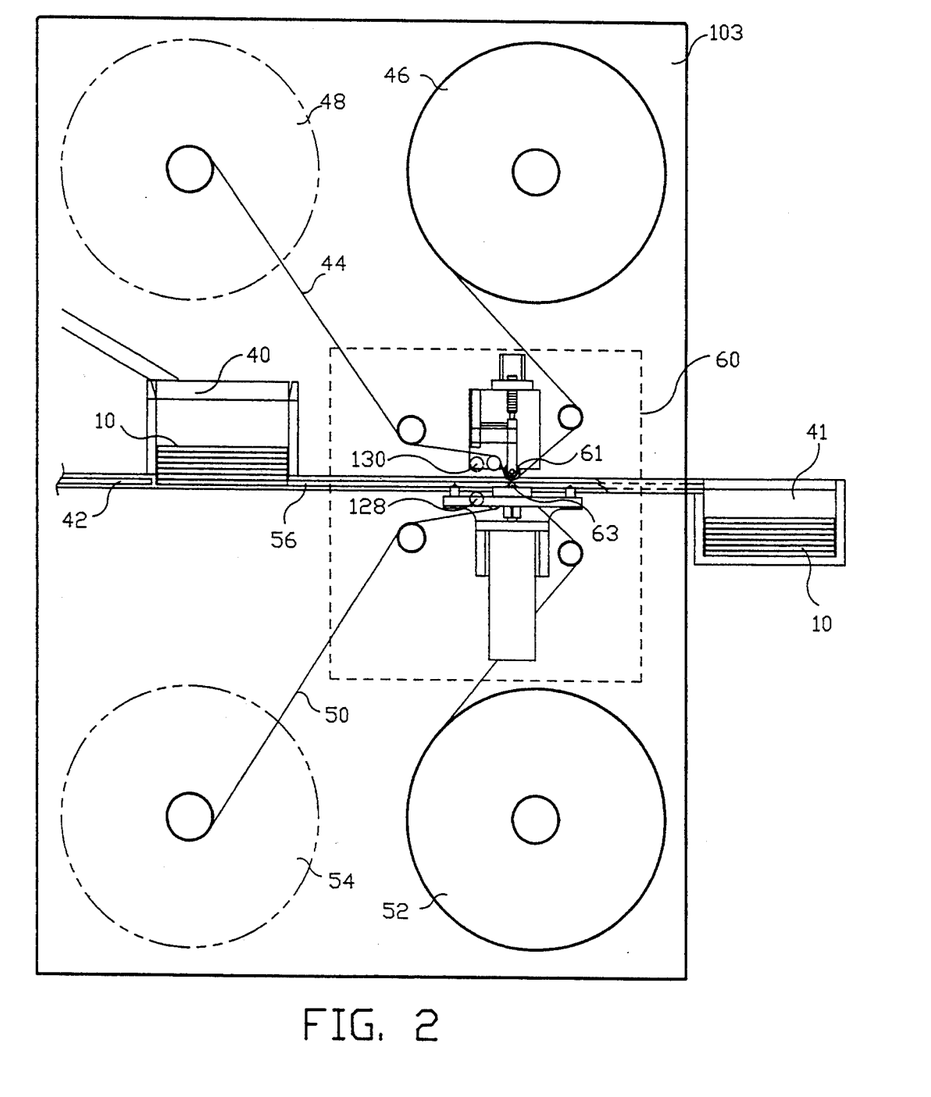
FIG. 2 is a schematic elevational view of the preferred embodiment of a burnishing machine according to the present invention.

The present invention utilizes the described features of a standard computer drive's alignment, centering and chucking mechanisms to produce a burnishing action that is concentric with the magnetic tracks in the disk. Thus, the assembled diskette is burnished by pressing abrasive tape against the disk 12 through the window 24 on both sides of the diskette while the disk is rotated by a motor assembly having the same alignment and drive characteristics described above for a standard computer disk drive. Referring to FIG. 2, a schematic elevational view of the preferred embodiment of a burnishing machine according to the present invention is illustrated, wherein diskettes 10 are shown stacked in an automated feeder hopper 40 for sequential processing through the burnishing assembly 60 and subsequent discharge into a receiving hopper 41. The invention is illustrated with reference to a vertical frame wall 103 that could be free standing or mounted on conventional equipment cabinetry, FIG. 2 representing the front side of the wall 103. An upper abrasive tape 44 is threaded through the upper portion of the burnishing assembly 60 between a supply reel 46 and a take-up reel 48 with the abrasive surface facing down. Similarly, a lower tape 50 is threaded through the lower portion of the burnishing assembly 60 between a corresponding supply reel 52 and a take-up reel 54 with the abrasive surface facing up. During each cycle of operation, a diskette 10 is pushed forward from the hopper 40 by a push-plate 42 along a feed track 56 that is adapted to slidably hold the diskettes for engagement by the push-plate; and the diskette is positioned within the assembly 60 so that the windows 24 are disposed between two opposite, resilient, burnishing rollers 61 and 63 that push against segments of the abrasive tapes 44 and 50, respectively. As each diskette is processed, the push-plate 42 pushes a new diskette through the burnishing assembly and the processed one is moved along the track 56 into the receiving hopper 41.

Figure 3:
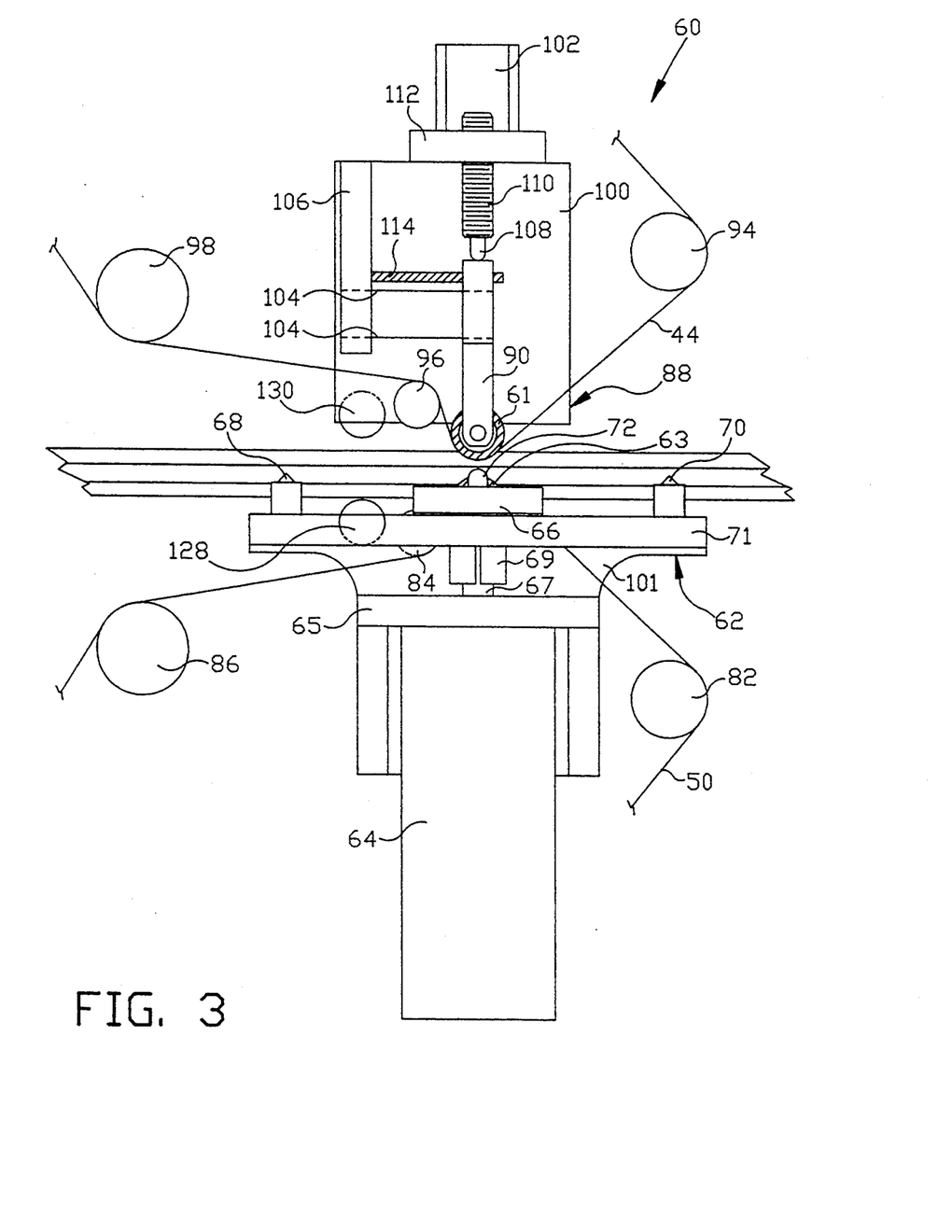
FIG. 3 is a front elevational view of the burnishing assembly seen in FIG. 2.
Figure 4:
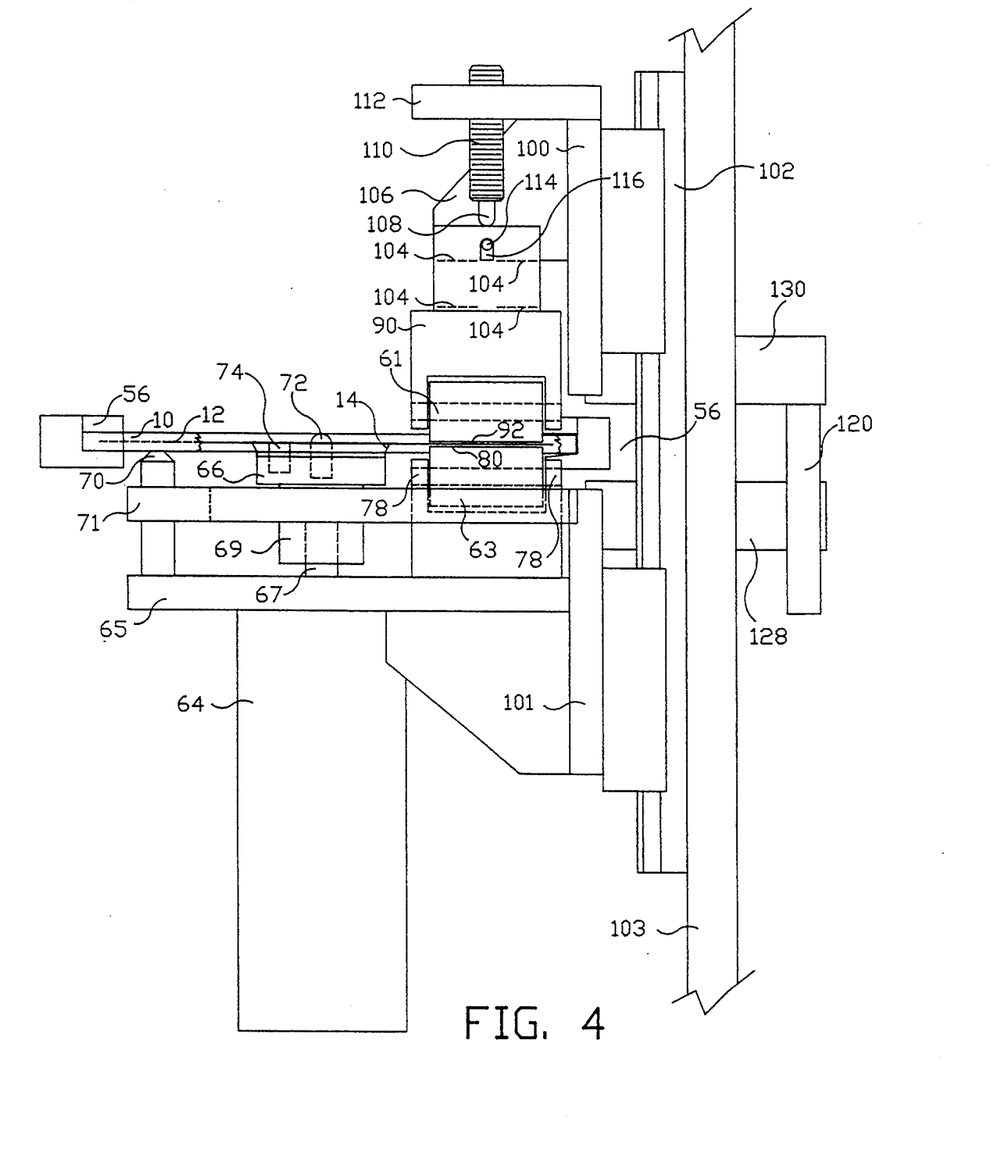
FIG. 4 is a side elevational view of the burnishing assembly of FIG. 3.

As illustrated in more detail in the front and side elevational views of FIGS. 3 and 4, the burnishing assembly 60 consists of two separate burnishing units for polishing the upper and lower side of a diskette 10 disposed therebetween. Each unit consists of an assembly slidably mounted on a vertical guide 102 installed on the frame wall 103 of the structure housing the apparatus. By virtue of this arrangement, the two burnishing units are kept in vertical alignment with one another within the tolerances of the slidable connection between the guide 102 and upper and lower frame-plates 100 and 101 on which the upper and lower unit, respectively, are mounted.

The lower burnishing unit 62 comprises a disk drive that consists of a DC drive motor 64 that is vertically anchored to a first horizontal plate 65 rigidly connected to the frame-plate 101. The shaft 67 of the motor is rotatably supported by a bearing 69 mounted through a second horizontal plate 71 rigidly connected to the frame-plate 101. The shaft 67 is adapted to actuate a magnetic horizontal spindle plate 66 to which the hub 14 of the disk becomes engaged when a diskette 10 is pushed in position by the push-plate 42. As each diskette 10 is moved into position in the burnishing assembly 60 through the track 56, as illustrated in FIG. 4 (wherein the tapes 44 and 50 are not shown for clarity), the whole unit 62 is pushed upwards along the guide 102 by an automatic cam mechanism described below that cyclically drives the lower frame-plate 101 up and down through the wall 103. As the unit 62 moved upward, two alignment pins 68 and 70 engage the alignment holes 32 and 34 in the shell 20 of the diskette to provide a first level of registration, so that the spindle 72 in the plate 66 may engage the central aperture 16 in the hub 14. The engagement of the metallic hub is further facilitated and strengthened by the magnetic character of the spindle plate 66. Once the diskette is so disposed, a spring-loaded drive pin 74 (seen in FIG. 4) protrudes upwards from the spindle plate 66 to engage the radial hole 18 in the disk's hub 14 as the motor 64 drives the spindle plate 66, the whole mechanism functioning with the same engagement action of a computer disk drive during use.

As the hub of the diskette 10 is engaged by the spindle 72 and drive pin 74, a mechanical arm (not shown in the pictures) retracts the shutter 26 to expose the upper and lower windows 24 of the disk shell in the same manner used to gain access to the disk during use in a computer disk drive. Thus, the top and bottom surfaces of the disk 12 become accessible for contact by both abrasive tapes 44 and 50 under the pressure exerted by burnishing the rollers 61 and 63. The lower burnishing roller 63 is rotatably mounted between two jaws of a lower supporting frame 78 with its main axis in exact radial relation to the spindle 72 and with its upper edge 80 coinciding substantially with the plane of the disk 12 after its engagement by the spindle plate 66 (see FIG. 4). As mentioned above, the abrasive tape 50 is fed from the supply reel 52 to the lower burnishing roller 63 through an alignment roller 82. The tape is passed over the burnishing roller 63, so as to be adapted to contact the disk 12 through the lower window 24 as a result of the supporting pressure exerted by the burnishing roller 63. As it moves forward, the tape 50 is then directed to the take-up reel 54 through an additional alignment roller 84 and a metering roller 86. The advancement of the tape 50 within the lower burnishing unit 62 is explained in detail below.

The upper burnishing unit 88 comprises the upper burnishing roller 61 rotatably mounted between two jaws of an upper supporting frame 90 with the roller's main axis parallel to the axis of the lower burnishing roller 63, that is, also in exact radial relation to the spindle 72, and with its lower edge 92 coinciding substantially with the plane of the disk 12 after it is positioned on the spindle plate 66 (FIG. 4). The abrasive tape 44 is fed from the supply reel 46 to the upper burnishing roller 61 through an alignment roller 94. As in the case of the lower burnishing unit, the tape is passed over the burnishing roller 61 so as to be adapted to contact the disk 12 through the upper window 24 as a result of the pressure exerted by the burnishing roller 61. As the tape 44 moves forward, it is directed to the take-up reel 48 through an additional alignment roller 96 and a metering roller 98. The advancement of the tape 44 within the upper burnishing unit 88 is also explained in detail below.

The upper burnishing unit 88 (and therefore the upper burnishing roller 61) is anchored to the upper vertical frame-plate 100 which, as mentioned above, is adapted for vertical slidable movement along the rigid vertical guide 102 affixed to the frame wall 103 of the machine. The guide 102 provides the supporting structure and vertical alignment for the upper and lower burnishing units 62 and 88. The position of the frame-plate 100 is also controlled by a cam mechanism that cyclically moves it a predetermined distance up and down along the guide 102. The cam mechanism is adapted to cause the upper burnishing roller 61 to be sufficiently removed from the lower burnishing roller 63 to permit the placement of a diskette 10 therebetween through track 56 when the roller 61 is in the up position. Alternately, when in the down position, the mechanism is designed to allow the upper burnishing roller 61 to press against the disk with an adjustable predetermined force.

In order to control the force with which the lower burnishing roller 61 impacts the surface of the disk 12 (through the abrasive tape 44) when the frame-plate 100 is pushes downward, the upper supporting frame 90 is adapted to yield vertically at a predetermined load. This is achieved by anchoring the frame 90 on one or more pairs of horizontal cantilever springs 104 (two pairs are shown in the figures) perpendicular to the frame 90 and protruding from an upper vertical plate 106 (parallel to the frame 90) rigidly affixed to the frame-plate 100. As a result of this configuration, the supporting frame 90 is free to move vertically in parallel to itself as the cantilever springs 104 bend up or down, subject only to a negligible lateral displacement caused by the bending of the springs. The supporting frame 90 is urged downward by an adjustable spring-loaded push rod 108 protruding from a hollow threaded bolt 110 screwably connected to an upper horizontal plate 112 attached to the frame-plate 100. A travel-limiting rod 114 rigidly attached to the vertical plate 106 protrudes toward the supporting frame 90 in parallel to the cantilever springs 104 (when they are free of tension) and is engaged by a vertical slot 116 in the upper portion of the frame 90 (see FIG. 4). The slot 116 consists of an aperture having an oblong vertical cross-section, whereby the supporting frame 90 is free to move vertically between the limits allowed by the rigid travel-limiting rod 114 positioned therethrough. The position of slot 116 within the supporting frame 90 is chosen such that the travel-limiting rod 114 abuts the upper edge of the slot 116 when the cantilever springs 104 are relaxed and parallel to the rod 114. Thus, the vertical travel of the supporting frame 90 with respect to the rod 114 is stopped by the rod in the downward direction, but is free to the extent of the height of the slot 116 in the upward direction. The tension of the spring-loaded push rod 108 is adjusted by screwing or unscrewing the bolt 110 through the plate 112 to produce the desired downward pressure, so that the supporting plate 90 (and therefore also the upper burnishing roller 61) can move upward (with respect to the rod 114) only when sufficient upward force is exerted to overcome that pressure. This mechanism makes it possible to control the maximum force exerted by the upper burnishing roller 61 on the magnetic disk 12, so that unnecessary wear is avoided during the polishing process.

Thus, during each cycle of operation the lower burnishing unit 62 is raised by the cam mechanism by sliding the frame-plate 101 along the guide 102 so as to permit the engagement of the disk hub 14 by the spindle plate 66 as soon as each diskette 10 is pushed by the push-plate 42 in alignment with the lower burnishing unit within the track 56 as detailed above. This motion brings the lower burnishing roller 63 and the abrasive tape 50 riding on it to bear on the lower surface of the disk 12 through the lower window 24. Contemporaneously, the upper burnishing unit 88 is lowered by the cam mechanism by sliding the frame-plate 100 along the guide 102 and the upper burnishing roller 61 is pushed to bring the tape 44 into contact with the upper surface of the disk 12. The pressure exerted by the upper roller 61 also causes the bottom surface of the disk 12 to be subject to an approximately equal pressure against the lower tape 50 by the supporting lower roller 63 in the lower burnishing unit. As the tapes 44 and 50 are pushed against both sides of the disk 12, the motor 64 spins the disk at high speed (preferably between 800 and 1,200 rpm), thus effecting a high-precision burnishing procedure. Concurrently, the tapes 44 and 50 are advanced at a speed designed to continuously renew the abrasive surface of contact with the disk at a rate suitable for efficient use of the tape. The metering rollers 86 and 98 measure the rate of advancement of each tape and provide a control signal to the take-up reels 54 and 48 to maintain a desired set-point speed. The various functions are controlled by a microprocessor according to techniques that are well known to those skilled in the art. In the preferred embodiment of the invention, each cycle of operation lasts approximately 4 seconds, whereby 15 diskettes per minute are burnished. The motor 64 rotates at 1,000 rpm for 3 seconds per cycle, so that the surface of each disk is worked approximately 50 times during the burnishing process. The tapes 44 and 50 are advanced at a speed of about 2.36 mm (3/32 inches) per second, so that approximately 7.08 mm (9/32 inches) of tape are used during each cycle.

In order to partly absorb the impact of the initial contact between the burnishing rollers and the disk, the rollers are preferably made of resilient material, such as polyurethane, with a hardness between 35 and 45 Shore "A" durometer units. In a machine designed to burnish 3.5-inch diskettes, the preferred size of each roller is about 0.4375 inches in diameter and about 0.849 inches long, so as to maximize the area of contact with the disk 12 through the access windows 24. We found that rollers with these characteristics produce optimal burnishing with no apparent scuffing of the disk 12 when the spring-loaded push rod 108 is set to yield at 1 to 2 pounds force.

Figure 5:
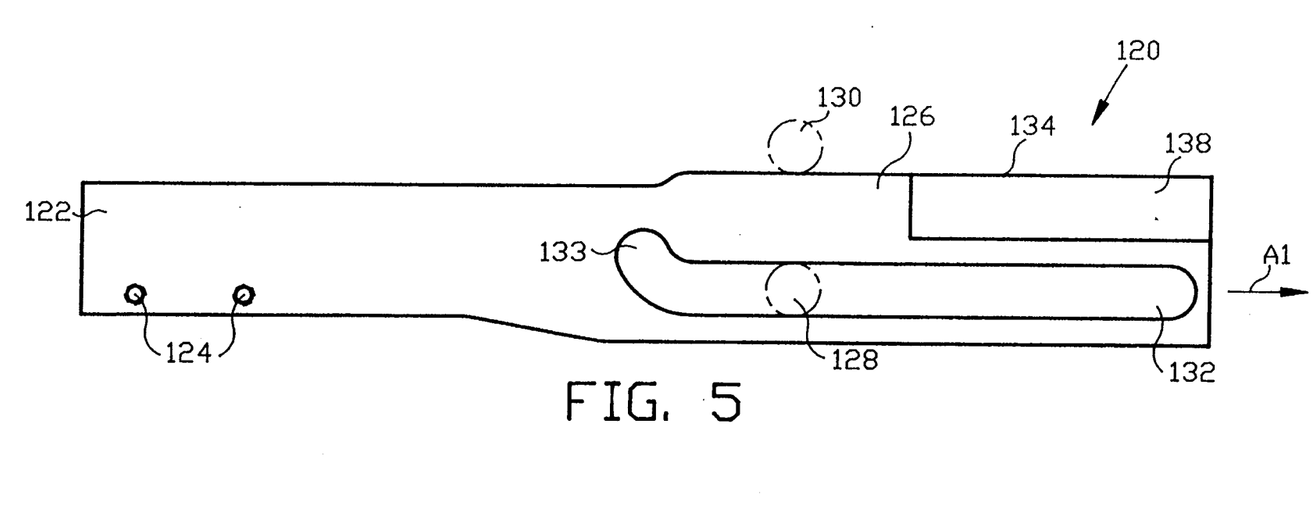
FIG. 5 is a front elevational view of a cam plate for concurrently actuating the diskette push-plate and the burnishing assembly of the invention.
Figure 6:
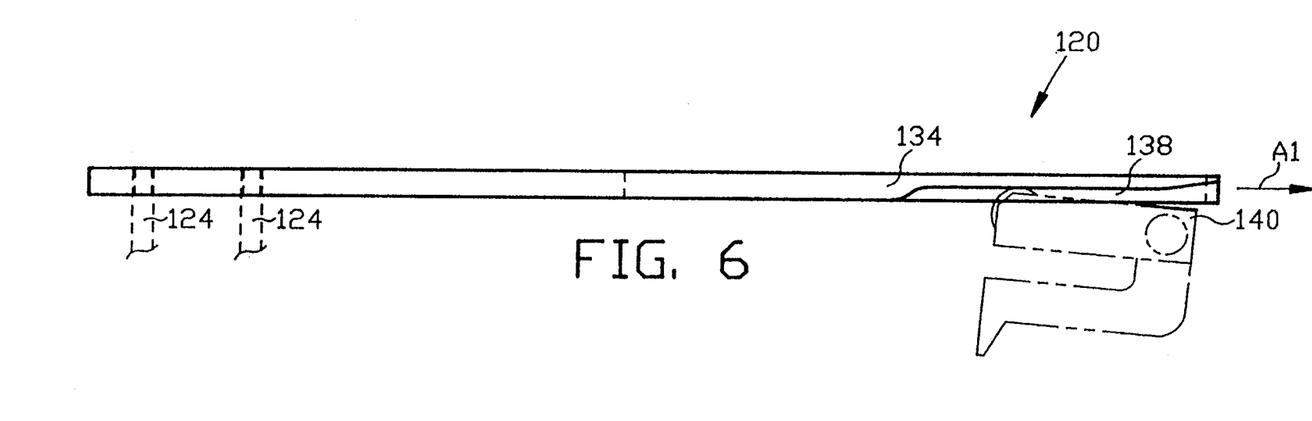
FIG. 6 is a plan view of the cam plate of FIG. 6.

While it is understood that the various functions of the apparatus of the invention may be implemented by means of different mechanical and electronic actuating devices, we found that a single cam mechanism with specific characteristics can be used to feed the diskettes through the burnishing assembly 60 and at the same time control the cyclical vertical motion of the burnishing rollers 61 and 63. As shown in isolation in elevational and top views in FIGS. 5 and 6, such a mechanism consists of a cam plate 120 mounted on the back side of the frame wall 103. For ease of understanding of how it correlates to the motion of the burnishing units 62 and 88, FIGS. 5 and 6 illustrate the cam plate 120 as it would be seen from the front through the wall 103. On the other hand, the cam plate 120 is shown in mirror image in FIG. 7, which illustrates schematically the preferred actuating and control mechanism mounted on the back side of the frame wall 103.

Through suitable apertures (not shown in the figures) in the frame wall, the back end 122 of the cam plate is linked to the push-plate 42 by means of rigid arms 124 or equivalent connecting structures, whereby the horizontal motion of the cam plate 120 causes the push-plate 42 to also slide horizontally within the track 56 and sequentially position each diskettes 10 in the hopper 40 within the burnishing assembly 60. The front end 126 of the cam plate is slidably connected to a lower cam-follower 128 rigidly attached to the lower frame-plate 101 and to an upper cam-follower 130 rigidly attached to the upper frame-plate 100. The lower cam-follower 128 is slidably mounted in a longitudinal slot 132 of the cam plate 120 (as shown in phantom line for illustration in FIG. 5) and is adapted to cause the lower burnishing unit 62 to slide vertically along the guide 102 as the cam plate completes a horizontal travel stroke. As is apparent from the geometry of the slot 132, the cam-follower 128 is kept at the same vertical position during most of the cam plate's forward stroke (the forward direction being designated by the arrows A1 in the drawings). This motion is used to push a diskette in alignment with the burnishing assembly. Toward the end of the forward stroke, the slot 132 is curved upward in a ramp 133 that causes the cam-follower 128 to push the lower burnishing unit 62 upward by a predetermined amount, as required for the spindle plate 66 to engage the hub 14 and for the lower burnishing roller 63 to engage the disk surface through the lower window 24.

The upper cam-follower 130 is adapted to slide on the top edge 134 of the cam plate 120 (as also shown in phantom line for illustration) and is subject to downward pressure by a pneumatic piston 136 (see FIG. 7) or equivalent driving device to cause it to rapidly move downward as permitted by the cam plate. Thus, as the cam plate travels forward (in the direction of arrow A1), the cam-follower 130 is kept mostly in the same vertical position by the opposing forces of the piston 136 and the top edge 134 of the cam plate. Toward the end of the forward stroke, the edge 134 is curved downward in vertical alignment with the ramp 133 allowing the piston 136 to push the upper cam-follower 130 downward, thus causing the upper burnishing unit 61 on the opposite side of the frame wall 103 to strike the disk 12 with the preset load of the push rod 108. The cam plate is then allowed to rest for a predetermined burnishing length of time before it is actuated in the opposite direction for a return stroke. Obviously, the return stroke causes the upper burnishing unit 88 to be raised clear of the diskette just processed and the lower burnishing unit 62 to disengage the disk's hub for the subsequent removal of the disk from the unit; at the same time, the push-plate 42 is repositioned behind the feed hopper 40, so that during the next forward stroke of the cam plate it pushes a new diskette forward into the burnishing unit while also pushing the previously-processed diskette out of the unit and into the receiving hopper 41.

The cam plate 120 also comprises a longitudinal groove 138 for actuating a lever arm 140 (shown schematically in phantom line in FIG. 6) adapted to open the normally-closed protective shutter 26 during the plate's forward stroke. Inasmuch as the action of a lever-arm mechanism of the type illustrated in the drawing could be implemented in various obvious ways by those skilled in the art, such as the manner used in conventional computer disk drives, the details of its structure and manner of operation are not discussed herein.

Figure 7:
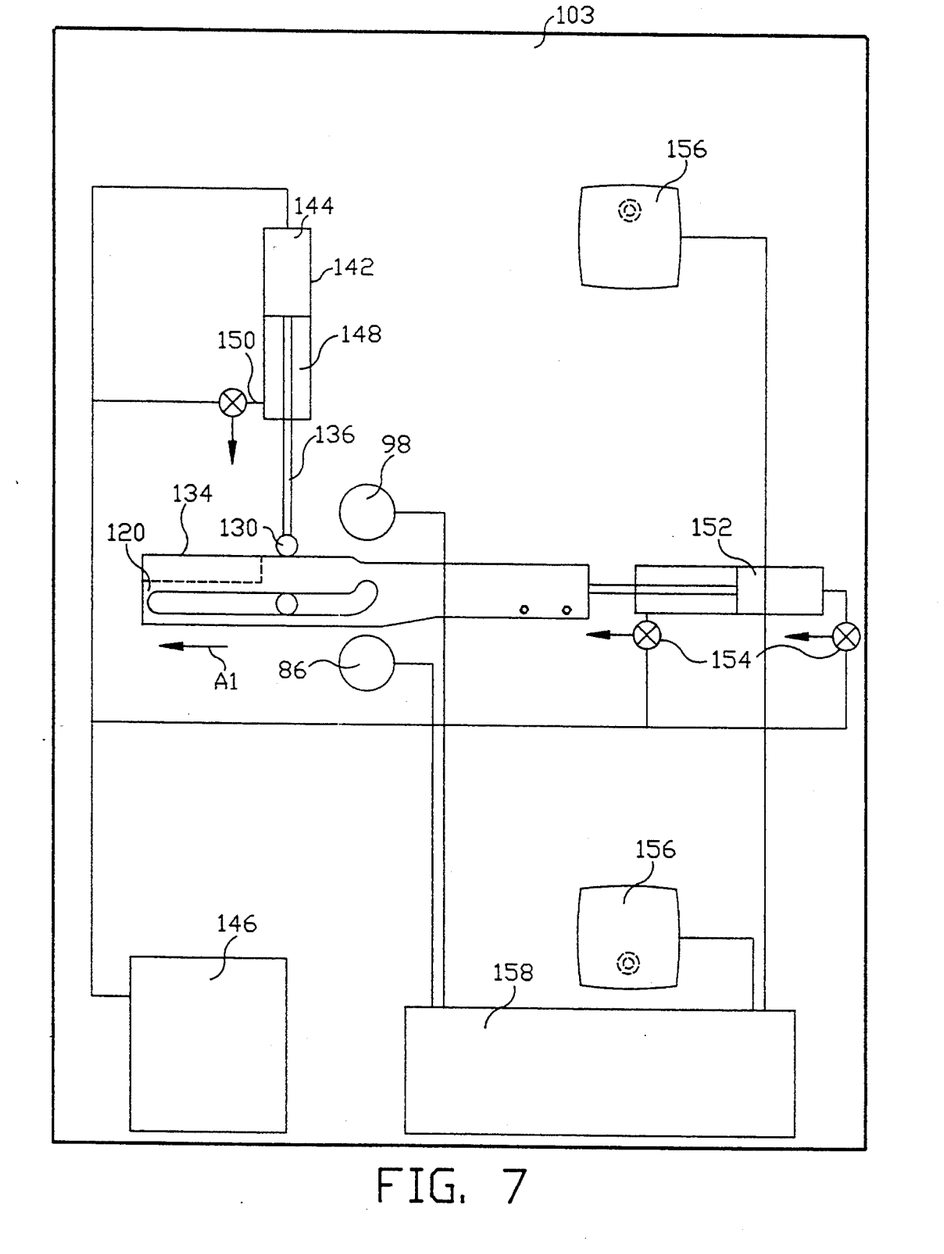
FIG. 7 illustrates schematically the preferred actuating and control mechanism mounted on the back side of the frame wall of the invention.

Referring to FIG. 7, a preferred manner for driving and controlling the function of the various mechanical components of the invention is illustrated. The piston 136 is actuated by a double-action pneumatic cylinder 142 wherein an upper chamber 144 is always pressurized by a pressure source 146 to a sufficiently high pressure (preferably 60 psia) to cause the rapid downward motion of the cam-follower 130 when allowed by the cam plate 120. A lower chamber 148 is also pressurized by the same pressure source during the return stroke of the cam plate in order to create a back pressure in the cylinder 142 that is available to further dampen the action of the upper burnishing roller 61 as it descends on the disk 12 during the forward stroke. At the beginning of the return stroke, the lower chamber 148 is vented to atmosphere through a three-way valve 150 or equivalent device that permits its discharge and the contemporaneous increase in the pressure differential between the upper and lower chambers in the cylinder which results in the dampened downward stroke of the piston 136. Obviously, this dampening effect may be regulated by controlling the orifice through which the lower chamber is vented.

The horizontal motion of the cam plate 120 is achieved by mounting it slidably on a horizontal guide (not shown in the figures) rigidly attached to the back side of the wall 103. The cam plate is preferably also driven by a double-action pneumatic cylinder 152 that may be powered by the same pressure source 146. Three-way valves 154 or equivalent devices cyclically charge one of the cylinder chambers while venting the other to atmosphere to cause the stroke in one direction; alternately, the reverse is done to cause the stroke in the opposite direction. Take-up DC motors 156 drive the take-up reels 48 and 54 in accordance with signals generated by a microprocessor 158 as a result of speed-metering information received on-line by the metering rollers 86 and 98. The same microprocessing unit is preferably also used to control the operation of the valves 150 and 154 in the pneumatic system.

In the preferred embodiment of the invention, the cylinder 142 consists of a unit sold by Clippard Instrument Laboratory, Inc., of Cincinnati, Ohio, as Part No. UDR-08-1/2MB and the cylinder 152 is a unit sold by PhD, Inc., of Fort Wayne, Ind., as Part No. AVP3/4x4-1/2-B-E. The microprocessor 158 is a unit manufactured by the IDEC Corporation of Sunnyvale, Calif., and marketed as Module CPU-PF3S-CP11T. Each of the take-up motors is a Model No. 3402-003 (KD-9 Series) sold by the Minarik Company of Glendale, Calif.; and the drive motor 64 is a Model 41.032.032-00.00-252 by Maxon Precision Motors of Burlingame, Calif. The abrasive tape consists of a mylar substrate coated with 1-μm silicon-carbide particles; this type of tape is available under the trademark "Mipox" from the Nihon Micro Coating Co., Ltd. of Japan. The resilient burnishing rollers are custom made according to the hardness specifications detailed above. Finally, the vertical guide 102 is available in a variety of models from THK Co., Ltd., of Tokyo, Japan.

Although described in the context of specific components mounted on a vertical support structure, the machine of the invention could obviously be designed in various other ways with equivalent functional characteristics. Obviously, any conventional means of construction is acceptable for the manufacture of the frame and housing of the apparatus. Similarly, many obvious particulars of the machine are not described here because they do not represent inventive subject matter, but rather simple solutions to well understood accessory requirements of the invention. For example, the apparatus must be wired for connection of its components with the control unit and to a power source, and the pneumatic system must be plumbed in ways that would be obvious to one skilled in the art to achieve the objectives of the invention.

Accordingly, various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus and methods.

We claim:

1. A machine for the sequential burnishing of a plurality of assembled computer diskettes, each diskette consisting of a magnetic disk enclosed in a protective shell, said disk having a center hub for engagement with a driving mechanism in a computer disk drive and said shell having an access window for engagement of a side of the disk by a read/write head, comprising:

(a) a burnishing assembly comprising a spindle plate adapted to engage the hub of the disk; an abrasive tape disposed in alignment with said access window after engagement of the hub by the spindle plate; and a burnishing roller aligned with said tape and access window and adapted to alternately assume a working position, wherein the roller urges the tape through the access window against the disk to cause the burnishing thereof, and an idle position, wherein the roller is withdrawn from the disk;

(b) means for alternately causing the burnishing roller to assume said working position for a first predetermined period of time while the disk is engaged by the spindle plate and to assume said idle position for a second predetermined period of time at the end of said first period of time;

(c) means for spinning said spindle plate during said first predetermined period of time; and (d) means for sequentially feeding an unprocessed diskette through said burnishing assembly for engagement with the spindle plate when said burnishing roller is in the idle position and for contemporaneously removing a last-processed diskette from the burnishing assembly.

2. The machine described in claim 1, wherein the engagement of the hub of the disk by said spindle plate is achieved by means of a device equivalent to said driving mechanism in the computer disk drive.

3. The machine described in claim 1, wherein said spindle plate further comprises a spindle for engagement of a central aperture in said hub of the disk and a spring-loaded drive pin protruding upwards from the spindle plate for engagement of a radial aperture in the hub of the disk.

4. The machine described in claim 2, wherein said spindle plate is magnetic.

5. The machine described in claim 1, wherein said burnishing roller is disposed radially with respect to the disk engaged by the spindle plate.

6. The machine described in claim 1, wherein said burnishing roller is resilient.

7. The machine described in claim 6, wherein said burnishing roller is made with polyurethane.

8. The machine described in claim 7, wherein said burnishing roller has a hardness between 35 and 45 Shore "A" durometer units.

9. The machine described in claim 1, wherein said means for spinning said spindle plate during said first predetermined period of time consists of an electric motor.

10. The machine described in claim 1, wherein said means for sequentially feeding an unprocessed diskette through said burnishing assembly and for contemporaneously removing a last-processed diskette from the burnishing assembly consists of a push-plate adapted to engage the unprocessed diskette from a feed hopper and push it forward along a feed track wherein the unprocessed diskette and the last-processed diskette are sequentially slidably disposed.

11. A machine for the sequential burnishing of a plurality of assembled computer diskettes, each diskette consisting of a magnetic disk enclosed in a protective shell, said disk having a center hub for engagement with a driving mechanism in a computer disk drive and said shell having two opposite access windows for engagement of opposite sides of the disk by read/write heads, comprising:

(a) a lower burnishing unit comprising a spindle plate adapted to engage the hub of the disk; a lower abrasive tape disposed in alignment with one of said access windows after engagement of the hub by the spindle plate; and a lower burnishing roller aligned with said lower tape and one access window and adapted to alternately assume a working position, wherein the lower burnishing roller urges the lower tape through the one access window against one of said opposite sides of the disk to cause the burnishing thereof, and an idle position, wherein the lower burnishing roller is withdrawn from the disk;

(b) an upper burnishing unit comprising an upper abrasive tape disposed in alignment with the other of said access windows after engagement of the hub by the spindle plate; and an upper burnishing roller aligned with said upper tape and other access window and adapted to alternately assume a working position, wherein the upper burnishing roller urges the upper tape through the other access window against the other of said opposite sides of the disk to cause the burnishing thereof, and an idle position, wherein the upper burnishing roller is withdrawn from the disk;

(c) means for alternately causing the upper and lower burnishing rollers to concurrently assume said working positions for a first predetermined period of time when the disk is engaged by the spindle plate and to assume said idle positions for a second predetermined period of time at the end of said first period of time;

(d) means for spinning said spindle plate during said first predetermined period of time; and (e) means for sequentially feeding an unprocessed diskette through the upper and lower burnishing units for engagement with the spindle plate when said upper and lower burnishing rollers are in the idle positions and for contemporaneously removing a last-processed diskette from the burnishing units.

12. The machine described in claim 11, wherein the engagement of the hub of the disk by said spindle plate is achieved by means of a device equivalent to said driving mechanism in the computer disk drive.

13. The machine described in claim 11 wherein said spindle plate further comprises a spindle for engagement of a central aperture in said hub of the disk and a spring-loaded drive pin protruding upwards from the spindle plate for engagement of a radial aperture in the hub of the disk.

14. The machine described in claim 12, wherein said spindle plate is magnetic.

15. The machine described in claim 11, wherein said upper and lower burnishing rollers are disposed radially with respect to the disk engaged by the spindle plate.

16. The machine described in claim 11, wherein said upper and lower burnishing rollers are resilient.

17. The machine described in claim 16, wherein said upper and lower burnishing rollers are made with polyurethane.

18. The machine described in claim 17, wherein said upper and lower burnishing rollers have a hardness between 35 and 45 Shore "A" durometer units.

19. The machine described in claim 11, wherein said upper and lower burnishing units are slidably mounted on a vertical guide and said means for alternately causing the upper and lower burnishing rollers to concurrently assume said working positions for a first predetermined period of time when the disk is engaged by the spindle plate and to assume said idle positions for a second predetermined period of time at the end of said first period of time consists of a cam mechanism connected to the lower burnishing unit through a lower cam-follower and connected to the upper burnishing unit through an upper cam-follower, each cam-follower being adapted to cause the vertical movement of the corresponding burnishing unit along said slide.

20. The machine described in claim 19, wherein said cam mechanism is actuated by a first double-action pneumatic cylinder controlled by a microprocessor.

21. The machine described in claim 20, wherein said cam mechanism includes a second double-action pneumatic cylinder controlled by said microprocessor; a first chamber of said second cylinder being continuously subject to a predetermined pressure for pushing the upper burnishing unit downward, and a second chamber of the cylinder being alternately subject to said predetermined pressure during said second predetermined period of time and subject to atmospheric pressure through a vent during said first predetermined period of time.

22. The machine described in claim 19, wherein said upper burnishing roller is rotatably mounted on a supporting frame adapted to yield vertically at a predetermined load.

23. The machine described in claim 22, wherein said predetermined load is adjustable by means of a spring-loaded push rod adapted to urge the upper burnishing roller downward.

24. The machine described in claim 22, wherein said supporting frame is attached to the upper burnishing unit via a plurality of springs adapted to allow the vertical movement of the upper burnishing roller with respect to the upper burnishing unit.

25. The machine described in claim 24, wherein said vertical movement of the upper burnishing roller with respect to the upper burnishing unit is constrained in the downward direction by a travel-limiting device.

26. The machine described in claim 25, wherein said travel-limiting device consists of a rod rigidly attached to said upper burnishing unit and slidably engaged by a slot in said supporting frame, whereby the supporting frame is free to move vertically in an upward direction from a position of rest against the rod but is prevented from moving in a downward direction therefrom.

27. The machine described in claim 11, wherein said means for spinning said spindle plate during said first predetermined period of time consists of an electric motor.

28. The machine described in claim 11, wherein said means for sequentially feeding an unprocessed diskette through said upper and lower burnishing units and for contemporaneously removing a last-processed diskette therefrom consists of a push-plate adapted to engage the unprocessed diskette from a feed hopper and push it forward along a feed track wherein the unprocessed diskette and the last-processed diskette are sequentially slidably disposed.

29. The machine described in claim 11, wherein each of said upper and lower abrasive tapes is advanced between a supply reel and a take-up reel at a rate automatically controlled by a microprocessor.

30. A machine for the sequential burnishing of a plurality of assembled computer diskettes, each diskette consisting of a magnetic disk enclosed in a protective shell, said disk having a center hub for engagement with a driving mechanism in a computer disk drive and said shell having two opposite access windows for engagement of opposite sides of the disk by read/write heads, comprising:

(a) lower abrasive means for burnishing the disk through one of said access windows, said lower abrasive means comprising a spindle plate adapted to engage the hub of the disk and being adapted to alternately assume a working position, wherein the lower abrasive means burnishes the disk through the one access window, and an idle position, wherein the lower abrasive means is withdrawn from the disk;

(b) upper abrasive means for burnishing the disk through the other of said access windows, said upper abrasive means being adapted to alternately assume a working position, wherein the upper abrasive means burnishes the disk through the other access window, and an idle position, wherein the upper abrasive means is withdrawn from the disk;

(c) means for alternately causing the upper and lower abrasive means to concurrently assume said working positions for a first predetermined period of time when the disk is engaged by the spindle plate and to assume said idle positions for a second predetermined period of time at the end of said first period of time;

(d) means for spinning said spindle plate during said first predetermined period of time; and (e) means for sequentially feeding an unprocessed diskette through said upper and lower abrasive means for engagement with the spindle plate when said upper and lower abrasive means are in the idle positions and for contemporaneously removing a last-processed diskette therefrom.

* * * * *